US006996601B1

(12) United States Patent
Smith (10) Patent No.: US 6,996,601 B1
(45) Date of Patent: Feb. 7, 2006

(54) PROCESS FOR MANAGING CHANGE WITHIN AN ENTERPRISE

(75) Inventor: H. Winnfred Smith, Sugar Hill, GA (US)

(73) Assignee: Sprint Communications Company L.P., Overland Park, KS (US)

( * ) Notice: Subject to any disclaimer, the term of this patent is extended or adjusted under 35 U.S.C. 154(b) by 577 days.

(21) Appl. No.: 09/915,846

(22) Filed: Jul. 26, 2001

(51) Int. Cl.
*G06F 15/16* (2006.01)
(52) U.S. Cl. ...................................... 709/203; 715/762
(58) Field of Classification Search ................ 709/217, 709/223, 204, 219, 224, 250, 203, 220; 707/1, 707/101, 10, 204, 4; 345/751; 715/511, 715/762; 378/22; 713/167, 100; 711/145; 705/36, 38, 10; 717/103, 124, 174; 700/83; 370/255, 466; 714/4
See application file for complete search history.

(56) References Cited

U.S. PATENT DOCUMENTS

| | | | | |
|---|---|---|---|---|
| 5,590,309 A | * | 12/1996 | Chencinski et al. | 711/145 |
| 5,706,452 A | * | 1/1998 | Ivanov | 345/751 |
| 5,768,586 A | * | 6/1998 | Zweben et al. | 713/100 |
| 5,867,799 A | * | 2/1999 | Lang et al. | 707/1 |
| 5,878,403 A | * | 3/1999 | DeFrancesco et al. | 705/38 |
| 5,911,136 A | * | 6/1999 | Atkins | 705/36 |
| 6,009,274 A | * | 12/1999 | Fletcher et al. | 717/173 |
| 6,049,664 A | * | 4/2000 | Dale et al. | 717/174 |
| 6,061,334 A | * | 5/2000 | Berlovitch et al. | 370/255 |
| 6,067,477 A | * | 5/2000 | Wewalaarachchi et al. | 700/83 |
| 6,067,525 A | * | 5/2000 | Johnson et al. | 705/10 |
| 6,105,132 A | * | 8/2000 | Fritch et al. | 713/167 |
| 6,154,738 A | * | 11/2000 | Call | 707/4 |
| 6,317,438 B1 | * | 11/2001 | Trebes, Jr. | 370/466 |
| 6,324,547 B1 | * | 11/2001 | Lennert et al. | 707/204 |
| 6,330,006 B1 | * | 12/2001 | Goodisman | 715/762 |

(Continued)

OTHER PUBLICATIONS

Object-oriented Database Management Systems for . . . — Emmerich, Kroha, Schäfer (1994) ; tokio.dbis.informatik.uni-frankfurt.de/REPORTS/GOODSTEP/GoodStepReport003.ps.gz.*

(Continued)

*Primary Examiner*—Thong Vu (57) ABSTRACT

The present invention is a Change Management Procedure that enables businesses and other enterprises to effectively manage, record, and communicate changes by employing a centralized control agency to review, approve, document, and communicate changes taking place within an enterprise. While the Change Management Procedure is applicable to any type of change, in the preferred embodiment the procedure manages changes in electronic computer systems including but not limited to architecture changes, outages (e.g., hardware, software or facility), replacement of hardware, upgrading of software, and rebooting of devices. By requiring that all changes be formally requested and approved, the Change Management Procedure prevents unauthorized changes. The Change Management Procedure also creates an audit trail that keeps a record of all changes for future reference. Another advantage of the Change Management Procedure is the communication of changes to operating units within the enterprise that are potentially interested in the change. At any step within the Change Management Procedure, entities that might be affected by a change may be notified of the change. Thus, potentially interested operating units can be aware of changes before they occur and can be informed of all changes that have occurred.

25 Claims, 9 Drawing Sheets

U.S. PATENT DOCUMENTS

| | | | |
|---|---|---|---|
| 6,366,919 B2 * | 4/2002 | O'Kane et al. | 707/101 |
| 6,370,573 B1 * | 4/2002 | Bowman-Amuah | 709/223 |
| 6,493,755 B1 * | 12/2002 | Hansen et al. | 709/224 |
| 6,535,913 B2 * | 3/2003 | Mittal et al. | 709/219 |
| 6,609,148 B1 * | 8/2003 | Salo et al. | 709/217 |
| 6,615,258 B1 * | 9/2003 | Barry et al. | 709/223 |
| 6,629,151 B1 * | 9/2003 | Bahl | 709/250 |
| 6,631,402 B1 * | 10/2003 | Devine et al. | 709/217 |
| 6,636,585 B2 * | 10/2003 | Salzberg et al. | 379/22 |
| 6,671,818 B1 * | 12/2003 | Mikurak | 714/4 |
| 6,675,205 B2 * | 1/2004 | Meadway et al. | 709/219 |
| 6,678,726 B1 * | 1/2004 | Moshaiov | 709/221 |
| 6,681,369 B2 * | 1/2004 | Meunier et al. | 715/511 |
| 6,721,740 B1 * | 4/2004 | Skinner et al. | 707/10 |
| 6,748,447 B1 * | 6/2004 | Basani et al. | 709/244 |
| 6,769,113 B1 * | 7/2004 | Bloom et al. | 717/103 |
| 6,769,114 B2 * | 7/2004 | Leung | 717/124 |
| 6,823,357 B1 * | 11/2004 | Du et al. | 709/203 |
| 6,868,441 B2 * | 3/2005 | Greene et al. | 709/220 |
| 2002/0078142 A1 * | 6/2002 | Moore et al. | 709/203 |

OTHER PUBLICATIONS

Web Document Clustering: A Feasibility Demonstration—Zamir, Etzioni (1998) ; zhadum.cs.washington.edu/zamir/sigir98.ps.* dSCAM: Finding Document Copies across Multiple Databases—Garcia-Molina, Gravano . . . (1996) ; www-db.stanford.edu/pub/gravano/1996/pdis96.ps.*

Object Management Group—Framingham Corporate ; www.buva.sowi.uni-bamberg.de/ps-Sammlung/corba/96-01-04.ps.gz.*

Data Warehousing and OLAP: Delivering Just-In-Time Information . . . —Breitner wwwipd.ira.uka.de/~breitner/Papers/970320_Oekonometrie.ps.gz.*

An Agent-Based Manufacturing Enterprise Infrastructure for . . . —Shen, Xue, Norrie (1998) ; imsg.enme.ucalgary.ca/publication/paam98.ps.*

Managing the Management: CORBA-based Instrumentation of . . . —Keller (1999) ; wwwmnmteam.informatik.uni-muenchen.de/common/Literatur/MNMPub/Publikationen/kell99/PDF-Version/kell99.pdf.*

The Evolving Philosophers Problem: Dynamic Change Management.—Kramer (1990) dse.doc.ic.ac.uk/dse-papers/conic/change.ps.Z.*

Efficient Management of Multiversion Documents by Object . . . —Chien, Tsotras, Zaniolo (2001) www.cs.ucla.edu/~csy/Publications/vldb.ps.*

Change-Centric Management of Versions in an XML Warehouse—Marian, Abiteboul, Mignet (2000) www.cs.toronto.edu/~mignet/Publications/bda2000-ver.pdf.*

Negotiation among Scheduling Agents—For Distributed Timetabling www.asap.cs.nott.ac.uk/patat/patat04/517.pdf.*

Data Filter Architecture Pattern Robert Flanders and Eduardo . . . —Dept Of Computer jerry.cs.uiuc.edu/~plop/plop99/proceedings/Fernandez/Flanders3.PDF.*

Specification in a Large Industry Consortium—The MOST Approach—Gaul, Löwe, Noga (2001) www.info.uni-karlsruhe.de/papers/gln2001-most.pdf.*

* cited by examiner

Change Management System

Active Change Requests

| Search Select | ID Z - A | Title | Customer | Status | Assigned To Group | Created By | Date Entered |
|---|---|---|---|---|---|---|---|
| [?] | | | | Any Status ▶ | | | > ▶ |
| ○ view | 1009 | TEST: Firewall problem | First Group America | Resolved | Architecture & Engineering | Bogus Level1 | 3/6/2001 11:21:37 AM |
| ○ edit | 1008 | This is just a draft | First Group America | Draft | | Bogus Level1 | 3/6/2001 11:19:13 AM |
| 710 | 720 | 730 | 740 | 750 | 760 | 770 | 780 |

*Quick* NAV

Logout - Bogus Level 1

Edit Your User Information

Change Request List

Enter New Change Request

*FIG. 4*

Change Management System

User Registration

Complete All Items Below to create or edit your user account. Contact your Manager if you have any questions or to have your access level increased.

* = Required Field

[Update User Registration] — 1095

*First Name: Bogus — 1010
*Last Name: Level1 — 1020
*User ID: bogus1

*Email Address: monte.fransen@mail.sprint.com — 1030

Your Email Address will be used for communication. Please use the Email Address that you wish to receive Time Management Communication at. Click the check box to receive Email Notifications About the Change Requests related to Your Company.

☑ Notify Me Via Email About All Change Requests.

*Company: First Group America
*Department: Change Management
*Business Phone: 404-649-0115 — 1040

Mobile Phone — 1050
Pager Number — 1060
Pager Pin — 1070

*Password: ****** — 1080
*Confirm Password: ****** — 1090

*FIG. 7*

Change Management System

Change Request

| | |
|---|---|
| 1150 — Save As Draft | Choose this option if all of the required fields are not filled out. The Change Request WILL NOT be submitted to Change Control but all of the information will be saved. |
| 1152 — Submit Request | Choose this option if you are ready to submit your request to Change Control. All required fields must be filled out. |

Change Request Title And Type

*Title Or Brief Description Of Change Request — 1102

| *Change Request Type — 1104 | *Customer Category — 1106 | *Group Initiating Change — 1108 |
|---|---|---|

| Vantive Case — 1110 | Remedy Case — 1112 | TRS Case — 1114 | EA Case — 1116 | OTS Case — 1118 |
|---|---|---|---|---|

Customer Information

*Company Name: First Group America
*Location Of Change (City) — 1120

Change Requestor Information

*Requestor Name: Bogus Level2 — 1122
*Phone (with dashes): 404-555-7213 — 1124

Change Owner Information

*Owner Name: Bogus Level2 — 1126
*Phone (with dashes): 404-555-7213 — 1128

Change Implementer(s)

*Change Request Assigned To Group: Not Yet Assigned

| Name — 1130 | Phone (with dashes) — 1132 |
| Name — 1134 | Phone (with dashes) — 1136 |
| Name — 1138 | Phone (with dashes) — 1140 |
| Name — 1142 | Phone (with dashes) — 1144 |

*Change Applies To

Hardware
Router
Switch
OS Patch
OS Upgrade
DB Patch
DB Upgrade
Application

Choose multiple items by holding the ctrl key down and selecting the items. — 1146

*Organizations Impacted

Architecture & Engineering
Backbone OPs
Change Management
Customer
Data Center OPs
DOSM
DSI
Edge Opps Choose multiple items by holding the ctrl key down and selecting the items. — 1148

*FIG. 8*

Change Management System

E-mail Group Management

Available E-Mail Groups

| Select | E-Group Name A - Z | Owner Company | Owner Group | Activate On Status | Description |
|---|---|---|---|---|---|
| 1210 ○ | Change Management | Sprint E\|Solutions | Change Management | Pending Approval | Send e-mail on status Pending Approval. |
| 1220 ○ | Change Management | Sprint E\|Solutions | Change Management | Submitted | Send e-mail when a change is submitted |
| 1230 ○ | Change Management | Sprint E\|Solutions | Change Management | Scheduled | E-mail with Scheduled |

1240 — [ Create New Group ]

Change Management System

E-mail Group Definition

Group Name 1310

[ Change Management ]

Group will be activated when the status of the Change Request is equal to...

[ Pending Approval ▼ ] — 1320

Owner Company

[ Sprint E|Solutions ▼ ] — 1330

Owner Group/Department

[ Change Management ▼ ]

Group Description 1340

Send e-mail on status Pending Approval.

1370 — [ Update Group ] 1350

[ Delete Group ] [ Cancel Action ]
1380            1390

Available Email Addresses

Sprint E | Solutions - James Barnwell-james.c.barnwell@mail.
Sprint E | Solutions - Jim Beame-monte.fransen@mail.sprint.c
Sprint E | Solutions - Andrew Beasley-andrew.f.beasley@mail.
Sprint E | Solutions - Scott Bosarge-scott.a.bosarge@mail.spr
Sprint E | Solutions - Anastasia Clark-anastasia.d.clark@mail.s
Sprint E | Solutions - Change Control-change.control@mail.sp
Sprint E | Solutions - Randell Daniels-randell.daniels@mail.sp
Sprint E | Solutions - Monte Fransen-monte.fransen@mail.spri
Sprint E | Solutions - Garfield Henry-garfield.henry@mail.sprin
Sprint E | Solutions - Alexis Holcomb-alexis.d.holcomb@mail.
Sprint E | Solutions - Rick Johnson-rick.k.johnson@mail.sprin
Sprint E | Solutions - Dwayne Moore-dwayne.l.moore@mail.s
Sprint E | Solutions - Gary Raney-gary.l.raney@mail.sprint.com
Sprint E | Solutions - Brian Sallee-brian.j.sallee@mail.sprint.c
Sprint E | Solutions - H Winnifred Smith-winnifred.x.smith@m
Sprint E | Solutions - Winnfred Smith-winnfred.x.smith@mail.
Sprint E | Solutions - David Sommers-david.f.sommers@mail.
Sprint E | Solutions - Michael Stubbs-michael.k.stubbs@mail.
Sprint E | Solutions - William Smith-william.b.smith@mail.spr

1360

*FIG. 10*

PROCESS FOR MANAGING CHANGE WITHIN AN ENTERPRISE

FIELD OF THE INVENTION

The invention is a method for managing change within an enterprise, more particularly for auditing and communicating changes made to electronic computing systems of the enterprise.

BACKGROUND OF THE INVENTION

Changes occur frequently in the processes and equipment of businesses and other enterprises and adverse effects can occur when unauthorized changes take place. Electronic computing systems, in particular, often undergo various modifications and unintended results can readily occur if the modifications are not approved by a knowledgeable authority or are not adequately communicated to all parties that might be impacted. Thus, a process for managing change comprising a centralized control agency is desirable to review, approve, document, and communicate changes taking place within an enterprise.

SUMMARY OF THE INVENTION

The method of the present invention, referred to herein as the Change Management Procedure, enables businesses and other enterprises to effectively manage, record, and communicate changes that occur within the enterprise. While the Change Management Procedure is applicable to any type of change, in a preferred embodiment the procedure manages modifications in electronic computer systems including, but not limited to, architecture changes, outages (e.g., hardware, software, or facility), replacement of hardware, upgrading of software, and rebooting of devices. By requiring that all changes be formally requested and approved, the Change Management Procedure prevents unauthorized changes. The Change Management Procedure also creates an audit trail that keeps a record of all changes for future reference. Another advantage of the Change Management Procedure is the communication of changes to operating units within the enterprise that are potentially interested in the change. At any step within the Change Management Procedure, entities that might be affected by a change may be notified of the change. Thus, potentially interested operating units can be aware of changes before they occur and can be informed of all changes that have occurred.

DESCRIPTION OF THE DRAWINGS

The invention, together with further advantages thereof, may best be understood by reference to the following description taken in conjunction with the accompanying drawings in which:

FIG. 9 is a printout of a computer screen depicting a web page used for managing email distribution groups.

FIG. 10 is a printout of a computer screen depicting a web page used for editing email distribution groups.

DETAILED DESCRIPTION

Management of change in the Change Management Procedure is achieved through the use of a change request document. The change request document can be a paper form, an email, a web page, or any similar means of documenting the changes to be made and the steps taken in the implementation of the changes. The entity requesting the changes and responsible for ensuring that the change request document is complete and accurate is known as the change requester. Alternatively, one entity can complete the change request document and another entity can ensure its completeness and accuracy. In this case, the entity completing the change request document would be known as the change requester and the entity ensuring its completeness and accuracy would be known as the change owner. For purposes of this application, unless otherwise specified, the change requester and the change owner are considered the same entity and are referred to as the change requester. The entity that manages changes and oversees the Change Management Procedure is known as the change manager. The change requester can be considered a client of the change manager. If the change requester and the change manager are members of different enterprises, a client service manager may be employed to act as a liaison between the change requester and change manager. In the case where the need for a change is identified by the change manager, the change manager can also function as the change requester. Implementation of changes is typically accomplished by an entity designated by the change manager or the change requester. The change requester, change manager, change implementer, and client service manager can be either individuals or organizations.

Access to the Change Management Procedure may be restricted to registered users authorized to submit change requests via the change request document. Registration can be done by means of a paper form, an e-mail, a web page, or any similar means of documenting information about the entity requesting authority to submit change requests. The registration documentation is submitted to the change manager for approval, which may further comprise checking to ensure that data has been entered in all fields of the registration form and/or performing background checks on the user submitting the registration form to ensure that the user has the proper authority and/or knowledge level to submit change requests.

Within the Change Management Procedure, different levels of authority may exist for users who submit change requests based upon a security clearance level and corresponding to an approved set of operations (such as viewing, editing, and/or submitting a change request document) that the change requester may perform. For example, the lowest level (0) could be new users who have submitted registration requests but whose registration requests have not yet been approved. Such users would be allowed access only to the registration form. The next highest level (1) could be users who are not employees of the same company as the change manager and are not under contract to that company but who may have a need to submit change requests. Such users would be allowed limited ability to complete and submit the change request document but would not have access to change requests made by others. The next highest level (2) could be users who are not employees of the same company as the change manager but who are under contract to that company. Such users would be allowed to complete and submit change request documents and would have access to change request documents submitted by others within their organization. The next highest level (3) could be users who are employees of the same company as the change manager. Such users would be allowed to complete and submit change request documents and would have the authority to see the change requests submitted by all other users. The highest level (4) could be members of the change management organization. Such users would have the authority to edit the change requests submitted by all other users.

A change can be either planned in advance or necessitated by an emergency. Planned change management is typically achieved through the following steps: submission of a change request document from the change requester to the change manager, broadcasting notice of a proposed change to potentially interested operating units within an enterprise, review of the proposed change by a change review team comprising the change manager and representatives of other potentially interested operating units who choose to participate, approval or rejection of the proposed change by the change review team, scheduling of an approved change by the change manager, possibly with input from the change review team, and implementation of the approved change by an individual or organization the change requester or the change manager designates. These steps, and variations and combinations thereof, constitute embodiments of the Change Management Procedure and are described in detail below.

The first step in the Change Management Procedure is typically the submittal of a change request document from a change requester to the change manager. The change request document typically includes information such as a description of the proposed change, justification of the proposed change, the predicted results and impact of the proposed change, the preferred date and time for implementation of the proposed change, and a plan for reversing the proposed change if implementation is unsuccessful. The change requester is responsible for ensuring that the change request document is complete and accurate.

The next step in the Change Management Procedure is typically the validation of the change request by the change manager. In the validation procedure, the change manager checks the change request document to ensure that it has been completed fully and accurately but no evaluation is made of the merits of the proposed change. If errors are found in the change request document, the document is returned to the change requester for revision. If no errors are found, the review process is initiated for the change request.

After validating a change request, the change manager sends notification about the proposed change to at least one representative of each operating unit within the enterprise that is potentially interested in the proposed change. Notification can be achieved through email, telephone, or other means of communication and is typically broadcast widely within the enterprise. For example, the change manager may maintain email distribution lists of operating units that are potentially interested in changes. The members of the lists may vary based upon their interest in disparate types of changes, and the change manager would choose the appropriate list to be notified for a proposed change.

All proposed changes are reviewed by a review team comprising the change manager and a representative of each potentially interested operating unit receiving notification of the proposed change and choosing to participate in the review team. The review team will recommend a course of action with respect to the proposed change, typically either approving or rejecting the proposed change, and will notify the change requester of the recommendation. If the proposed change is rejected, the change requester can either cancel the request or revise and resubmit the request. If the proposed request is approved, the change requester establishes a schedule for implementation of the change. Other members of the review team may offer input into the scheduling of the change. The potentially interested operating units can then be notified of the schedule for and the details of implementation of the change.

When a change is implemented by the change requester or a designee of the change requester or change manager, the implementation can occur as requested or some modification to the change as proposed may be necessary. If the change is implemented as requested, the change request document can be updated with information regarding the work that was done and all potentially interested operating units can be notified that the request was completed. If an asset management agency exists to oversee an organization's physical assets and the physical assets of that organization are impacted by a change implemented through the Change Management Procedure, the asset management agency can be notified of the change and their asset inventory and/or maintenance records updated accordingly.

If a change is not implemented successfully, the request for the change can be cancelled or the change can be rescheduled. If the request is cancelled, the steps taken in the attempted implementation of the change can be reversed, all potentially interested operating units can be notified, and the change request document can be updated with a description of the work that was and was not done and the reason for the cancellation. If the change is rescheduled, the partial, successful steps taken in the implementation of the change can be left in place, any remaining steps to be taken in the implementation of the change can be rescheduled, all potentially interested operating units can be notified, and the change request document can be updated with a description of the work that was and was not done.

When change requests are completed, whether the change was successfully implemented or not, a review of the change implementation process can be performed and reports can be created describing the results of the review.

In the preferred embodiment, the Change Management Procedure may be used to manage modifications in electronic computer systems including, but not limited to, architecture changes, outages (e.g., hardware, software or facility), replacement of hardware, upgrading of software, and rebooting of devices. Due to the highly interconnected nature of many computer systems, changes such as these in one part of a system can cause unintended effects in another part of the system. Use of the Change Management Procedure ensures that organizations and/or individuals within an enterprise that are potentially affected by a proposed change to a computer system are informed of the proposed change and are given the opportunity to offer comments on the scheduling, implementation, and consequences of the proposed change. Revisions to the proposed change can then be made, if necessary, so that all interested parties grant approval to the proposed change. Unanticipated adverse effects to computer systems can thus be minimized.

The Change Management Procedure can be applied to operating units within a single enterprise or to operating units in multiple enterprises. For example, the change requester and the change manager can be members of different departments within the same company. Alternatively, the change requester could be a member of one company and the change manager could be a member of another company. In the latter case, the change manager's organization may employ an individual or a group to act as a liaison between the change manager and the change requester.

When changes must be made due to an emergency, the procedures for planned change management cannot always be followed. In an embodiment of the Change Management Procedure, an emergency change request process can be instituted to manage changes that must be made on an emergency basis or in response to problem tickets generated through a problem management process.

Many organizations have a process for handling problems in which a document describing the problem is created and then assigned to the proper group for resolution. Any such document used in such a problem management process will be referred to as a problem ticket. Problem tickets are often assigned severity levels depending on the seriousness of the problem. An emergency would have a high severity level while a minor problem that has few adverse consequences would have a low severity level.

The emergency change request process is initiated in two ways: by the creation of a problem ticket requiring a change and by the occurrence of an emergency that does not require the creation of a problem ticket. For high severity problem tickets that can be resolved immediately, a change request is not necessary before commencement of problem resolution activities—the severity of the problem serves as the approval to make any necessary changes. In this case, the change implementer creates an emergency change request document after implementation of the change is complete. This post-problem emergency change request, containing a description of the change that was implemented, is submitted to the change manager for record keeping purposes.

For lower severity problems, high severity problems that cannot be resolved immediately, and emergencies not requiring a problem ticket, a modified form of the planned change request process is implemented. For emergencies not requiring a problem ticket, the change requester creates an emergency change request document and submits it to the change manager. In the cases where a problem ticket exists, the change manager reviews the problem ticket, determines that implementation of the change can be deferred, and notifies the change requester that an emergency change request must be submitted for approval. The change requester then creates an emergency change request document and submits it to the change manager. The change manager obtains approval for the change, a schedule for the implementation of the change is established with collaboration between the change manager, the change owner, and any potentially interested operating units, the potentially interested operating units are notified of the schedule, the change request is updated with the approval and scheduling information, and the change is implemented. The change request document is then updated with information regarding the change that was made, all potentially interested operating units are notified that the change has been completed, and the asset management agency is notified, if necessary. When the emergency change process is complete, a review of the process can be performed and reports can be created describing the results of the review.

If a change made in response to an emergency is not implemented successfully, the steps taken in the attempted implementation of the change are reversed, all potentially interested operating units are notified, and the change request document is updated with a description of the work that was and was not done.

As is the case in planned change management, the emergency change management procedure can be used to manage modifications in electronic computer systems. The emergency change management procedure can also be applied to operating units within a single enterprise or to operating units in multiple enterprises.

Use of the Change Management Procedure can be facilitated by implementing the procedure on an electronic computer system. In particular, the change request document can be placed on an interactive web page. Access to and authorization to enter data on this web page can be restricted to registered users according to their security clearance levels as described previously. Original submittal of and subsequent updates to a change request document would then be accomplished by an authorized change requester entering data into the fields of the online document and submitting the data to the change manager. The various notification steps within the Change Management Procedure, including broadcasting notice of a proposed change to potentially interested operating units, notifying the change requester of the review team's recommended course of action for a proposed change, and notifying potentially interested operating units of the status of a proposed, scheduled or implemented change, can also be accomplished electronically. These notification steps can be done through email or through updates to a web page accessible to the potentially interested operating units. Likewise, the review team meetings can be held by means of broadcasted emails or publicly updateable web pages rather than face-to-face meetings. Any reports evaluating the Change Management Procedure can be distributed by similar means.

EXAMPLES

Example 1

Planned Change

Figure 1A:
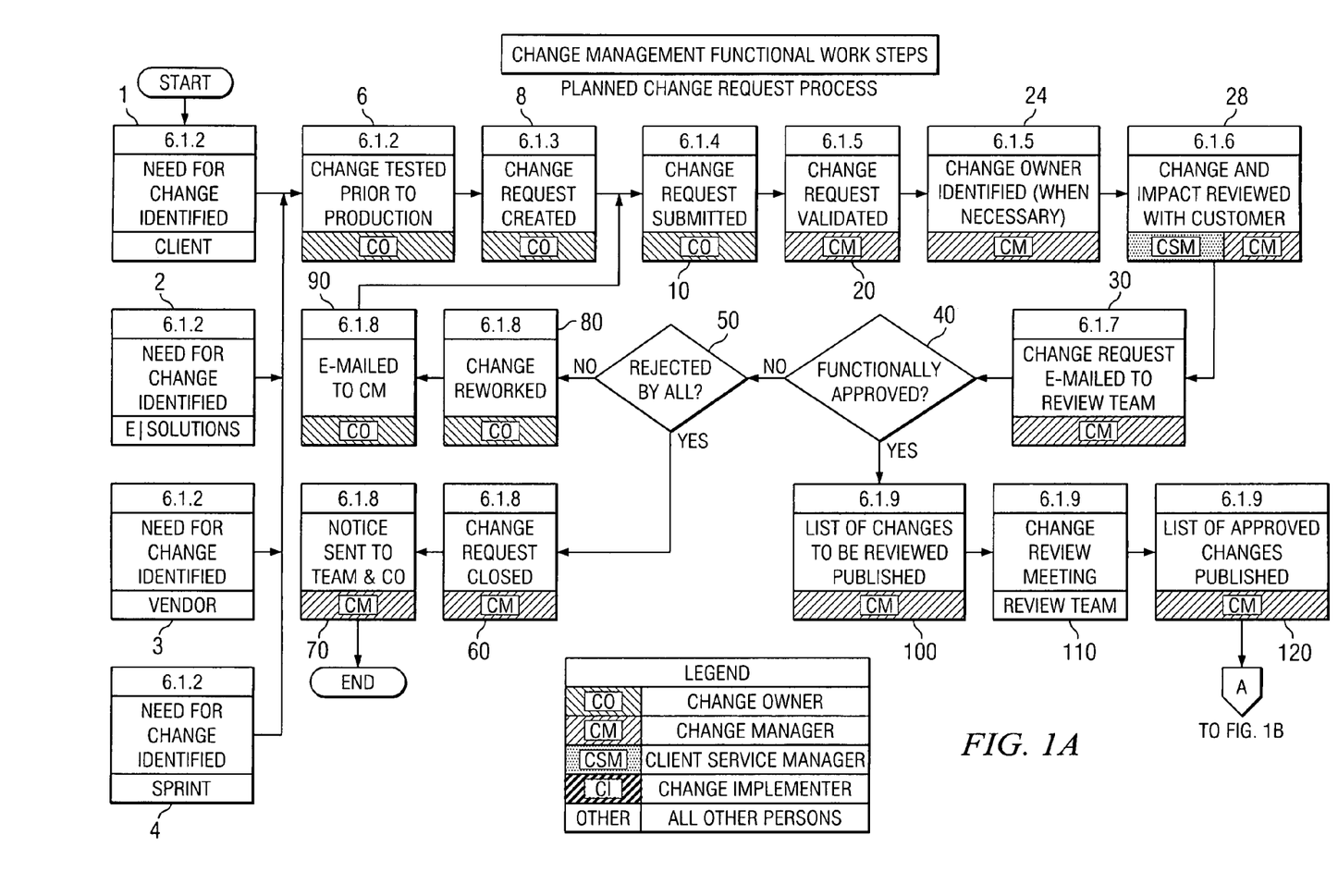
FIG. 1A is a flowchart depicting the steps in a planned change request process.
Figure 1B:
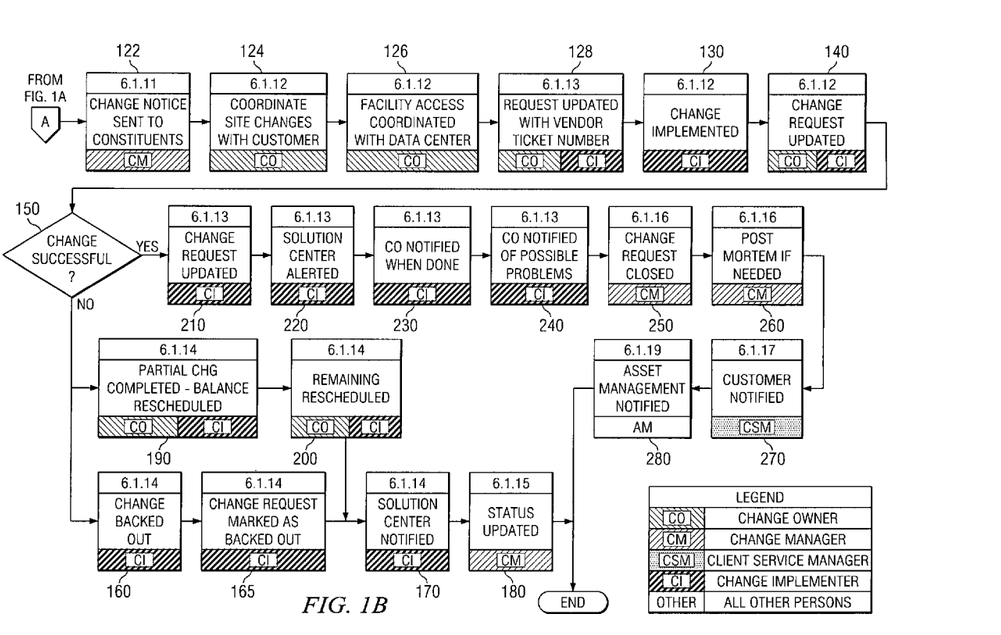
FIG. 1B is a flowchart depicting further steps in the planned change request process.

An example of the Change Management Procedure for a planned change is summarized in the flow charts in FIGS. 1A and 1B. The change requester is referred to as the change owner in the charts. In this example the change owner is not a member of the same enterprise as the change manager and therefore a client service manager is employed as a liaison between the change owner and the change manager. The change implementer can be a member of the change owner's organization, the change manager's organization, or a third party organization designated by the change owner or change manager.

At steps 1, 2, 3, and 4 a need for a change is identified by a member of the change owner's organization, a member of the change manager's organization, a third party, or a member of the change manager's enterprise outside the change manager's organization, respectively. The change owner tests the needed change at step 6 to ensure that it can be implemented successfully and with minimal impact to others. The testing may include conducting peer reviews to ensure the change implementation will accomplish the intended result. The change owner completes a change request document at step 8 and submits the change request document at step 10. At step 20 the change manager validates the change request. If a person within the change owner's organization has not been designated to take responsibility for the proposed change, the change manager designates such a person in step 24. The change manager, change owner, and client service manager review the proposed change at step 28 and establish a tentative schedule for implementation of the change. At step 30 the change manager distributes the change request document to the review team. Preliminary approval or rejection of the proposed change by the review team occurs at decision point 40. If the proposed change is rejected, two options are possible at decision point 50. If all parties involved in the review process reject the change, then the change manager closes the change request document in step 60 and sends notification to all potentially interested operating units in step 70. If all parties involved in the review process do not reject the proposed change, then the change owner can revise the change request document in step 80 and resubmit the document to the change manager in step 90. The Change Management Procedure then begins again at step 10 for the resubmitted change request. If, at decision point 40, the proposed change is approved, the change manager distributes the change request document to all potentially interested operating units in step 100. At step 110 a review meeting is held for a final clarification of any outstanding content, scheduling, or implementation issues. At step 120 the change manager provides a finalized list of approved changes to the other members of the review team.

The finalized change request document is distributed in a broadcast message from the change manager to all potentially interested operating units in step 122. At step 124 the change owner coordinates the approved change with the change implementer. At step 126 the change owner coordinates access to the facility at which the change will take place. At step 128 the change owner and/or the change implementer update the change request document with any information pertinent to the change management process as it has been implemented to that point. The change is implemented at step 130 and the change request document is again updated at step 140. When the implementation activities are complete, decision point 150 is reached. If the change was not successful, the change implementer reverses the attempted changes in step 160, updates the change request document in step 165, and notifies the change manager of the unsuccessful change implementation in step 170. The change owner updates the change request document in step 180. In an alternative course of action for an unsuccessful change, if the partial changes can be left in place in step 190 without impact, the remaining changes are rescheduled in step 200, the change implementer notifies the change manager as in step 170, and the change owner updates the change request document as in step 180. If the change was successful, the change implementer updates the change request document in step 210, notifies the change manager in step 220, notifies the change owner that the change has been successfully implemented in step 230, and notifies the change owner of any problems that occurred or may occur as a result of the change implementation process in step 240. At step 250 the change manager closes the change request document and at step 260 the change manager performs an analysis of the Change Management Procedure as it was applied in the newly completed change. At step 270 the client service manager notifies the change owner's organization that the change has been implemented successfully. In step 280 the asset management agency is notified of any changes that were made to physical assets.

Example 2

Emergency Change

Figure 2A:
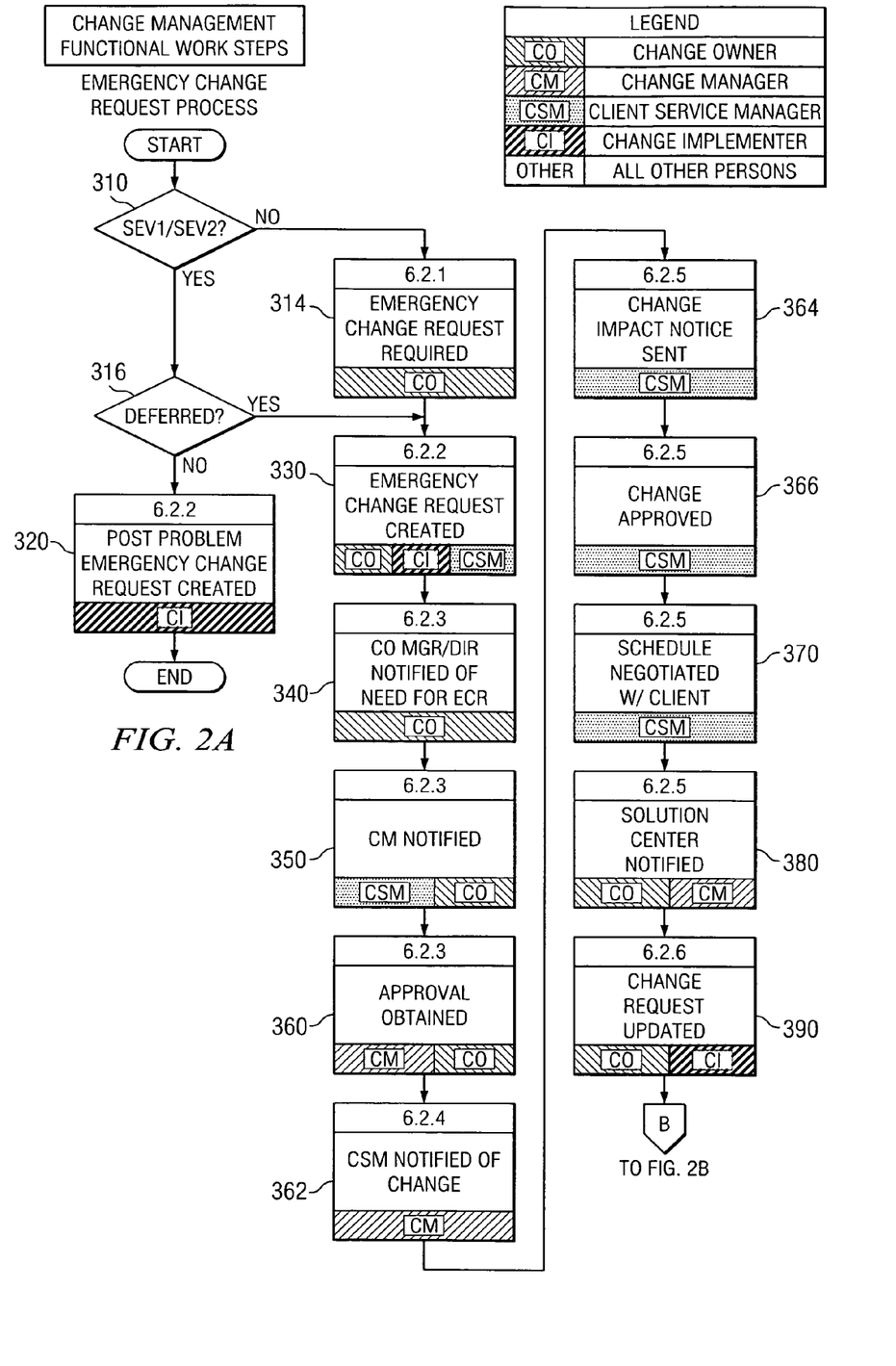
FIG. 2A is a flowchart depicting the steps in an emergency change request process.
Figure 2B:
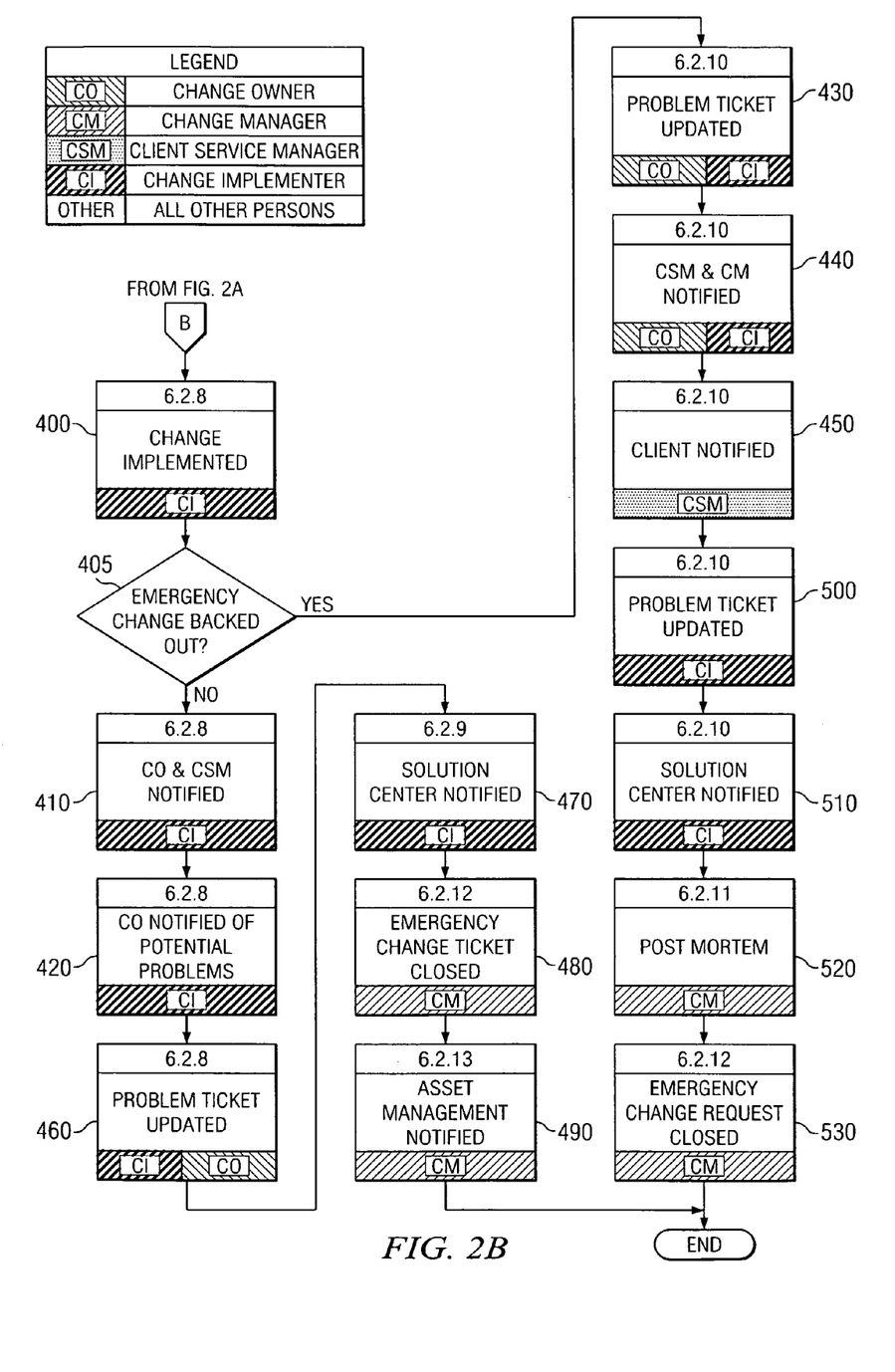
FIG. 2B is a flowchart depicting further steps in the emergency change request process.

An example of the Change Management Procedure for an emergency change is summarized in the flow charts in FIGS. 2A and 2B. The change management process starts at decision point 310 where proposed emergency changes are divided into two groups: those related to severity level 1 or 2 problem tickets (the two most severe levels) and those related to lower severity problem tickets or unrelated to the problem ticketing system. If the changes are related to severity 1 or severity 2 problem tickets, the change owner, in step 316, determines whether the resolution of the problem ticket can be deferred. If the resolution of the ticket cannot be deferred, the problem is resolved and then, in step 320, the change implementer creates a post-change emergency change request. If the resolution of the problem can be deferred, an emergency change request is created in step 330. The emergency change process then continues at step 340 as described below.

For changes related to lower severity problem tickets and for changes unrelated to the problem ticketing system, the change owner, in step 314, determines that an emergency change request document must be completed. For these cases and for severity 1 or 2 problems that can be deferred, an emergency change request is created as in step 330. At step 340 the change owner notifies the management of the change owner's organization that an emergency change request has been created. At step 350 the change owner submits the emergency change request to the change manager. The change manager obtains approval of the request in step 360 and notifies the client service manager in step 362. The client service manager sends a broadcast notice of the approved change to the change owner's organization step 364 and obtains final approval in step 366. A schedule for implementation of the change is established by the change owner and the client service manager in step 370. In step 380 the change owner notifies the change manager of the schedule for the change. The change owner and/or the change implementer update the emergency change request in step 390.

The change implementer implements the change in step 400. Alternative courses of action are taken at decision point 405 depending on whether or not the emergency change is backed out. If the emergency change is not backed out, the change implementer notifies the change owner and the client service manager in step 410 that the change was not backed out. At step 420 the change implementer notifies the change owner of any potential problems created by the change. The change owner and/or the change implementer update the emergency change request in step 460 and the change implementer notifies the change manager in step 470. The change manager closes the emergency change request in step 480 and notifies the asset management agency in step 490. If, at decision point 405, the emergency change is backed out, the change owner and/or the change implementer update the emergency change request in step 430 and notify the change manager and client service manager in step 440. If a third party other than the change owner and change manager is involved in the emergency change process, the client service manager notifies the third party in step 450. The change implementer updates the emergency change request in step 500 and notifies the change manager in step 510. The change manager performs an analysis of the Change Management Procedure as it was applied in the newly completed emergency change in step 520 and then closes the emergency change request in step 530.

Example 3

Computer Implementation

Figure 3:
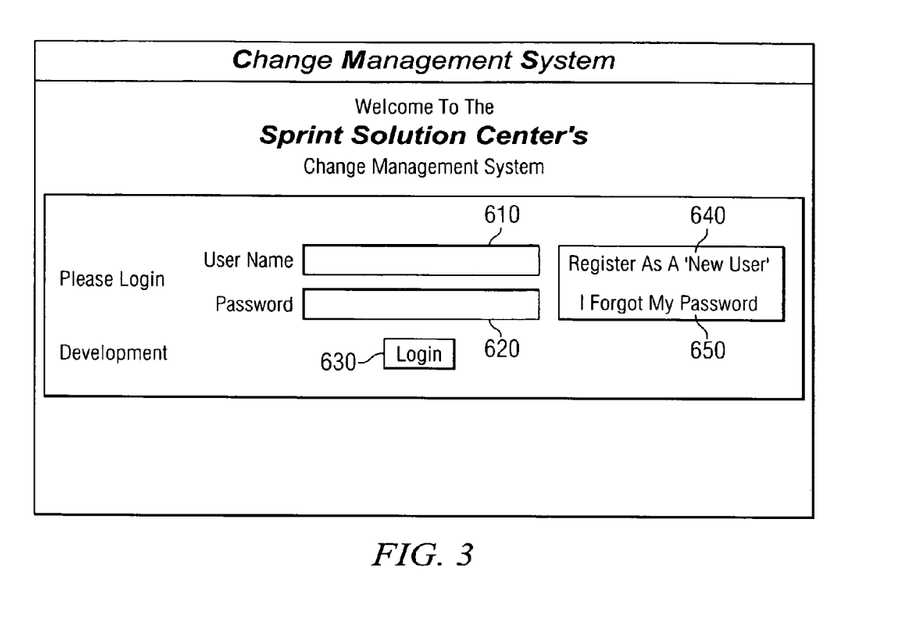
FIG. 3 is a printout of a computer screen depicting a web page used for logging in to the change management system.

Sample screens from a version of the Change Management Procedure implemented on a computer system are shown in FIGS. 3, 4, 5, 6, 7, 8, 9, and 10. FIG. 3 is an example of a web page users can use to log in to the computerized version of the Change Management Procedure. The user's name and password are entered in fields 610 and 620, respectively. Registered users use button 630 to log in to the change management system. New users who wish to register themselves into the system can use button 640. Button 650 provides help to users who cannot remember their passwords.

Figure 4:
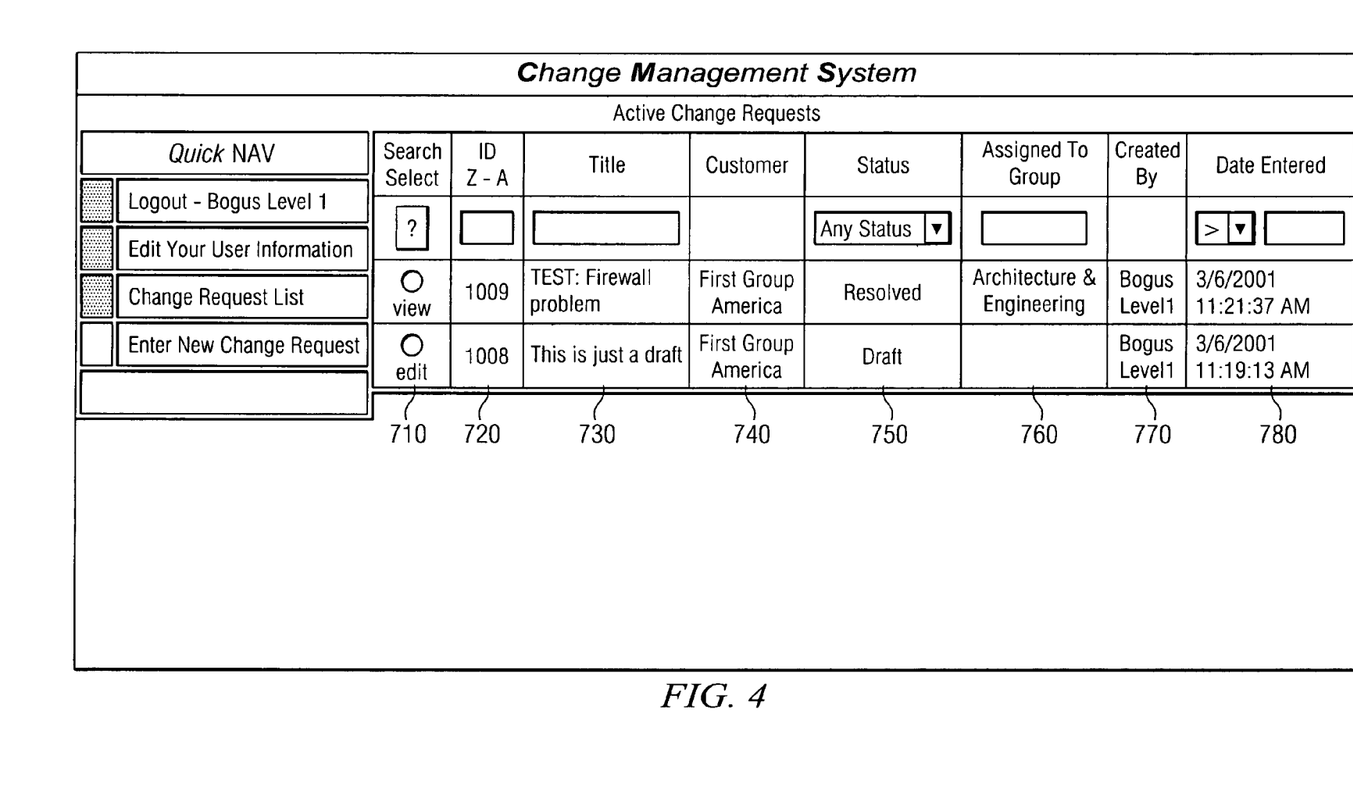
FIG. 4 is a printout of a computer screen depicting a web page used for viewing active change requests.

FIG. 4 is an example of a web page that displays active change requests. Column 710 allows a user to select whether a change request is to be viewed or edited and also allows a search to be performed. Column 720 lists the identification numbers of the change requests. Column 730 displays the titles of the change requests. Column 740 displays the customers requesting changes. Column 750 shows the status of the change requests. Column 760 displays the group to which the change requests have been assigned. Column 770 displays the individuals who submitted the change requests. Column 780 lists the dates the changes requests were submitted.

Figure 5:
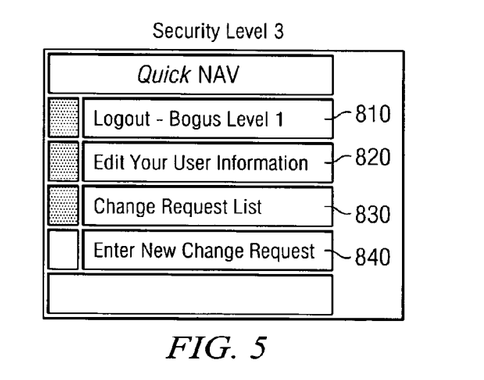
FIG. 5 is a printout of a computer screen depicting a menu of options available for users with security level 3.

FIG. 5 is an example of a menu listing the options available to a user who has a security level of 3. Field 810 allows the user to log out. Field 820 allows a user to edit user information. Field 830 allows a user to display the change request list. Field 840 allows a user to enter a new change request.

Figure 6:
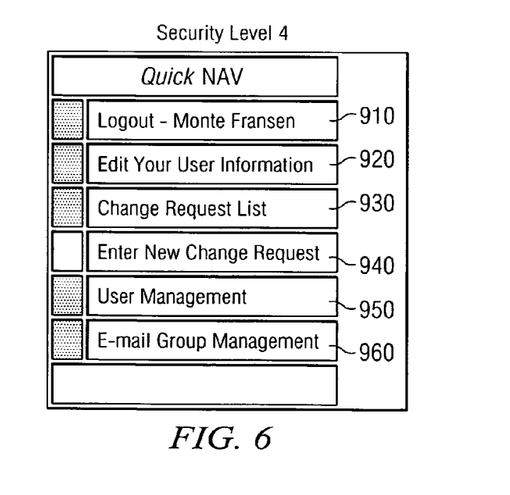
FIG. 6 is a printout of a computer screen depicting a menu of options available for users with security level 4.

FIG. 6 is an example of a menu listing the options available to a user who has a security level of 4. Field 910 allows the user to log out. Field 920 allows a user to edit user information. Field 930 allows a user to display the change request list. Field 940 allows a user to enter a new change request. Field 950 gives a user access to the user management screen. Field 960 gives a user access to the email group management screen.

Figure 7:
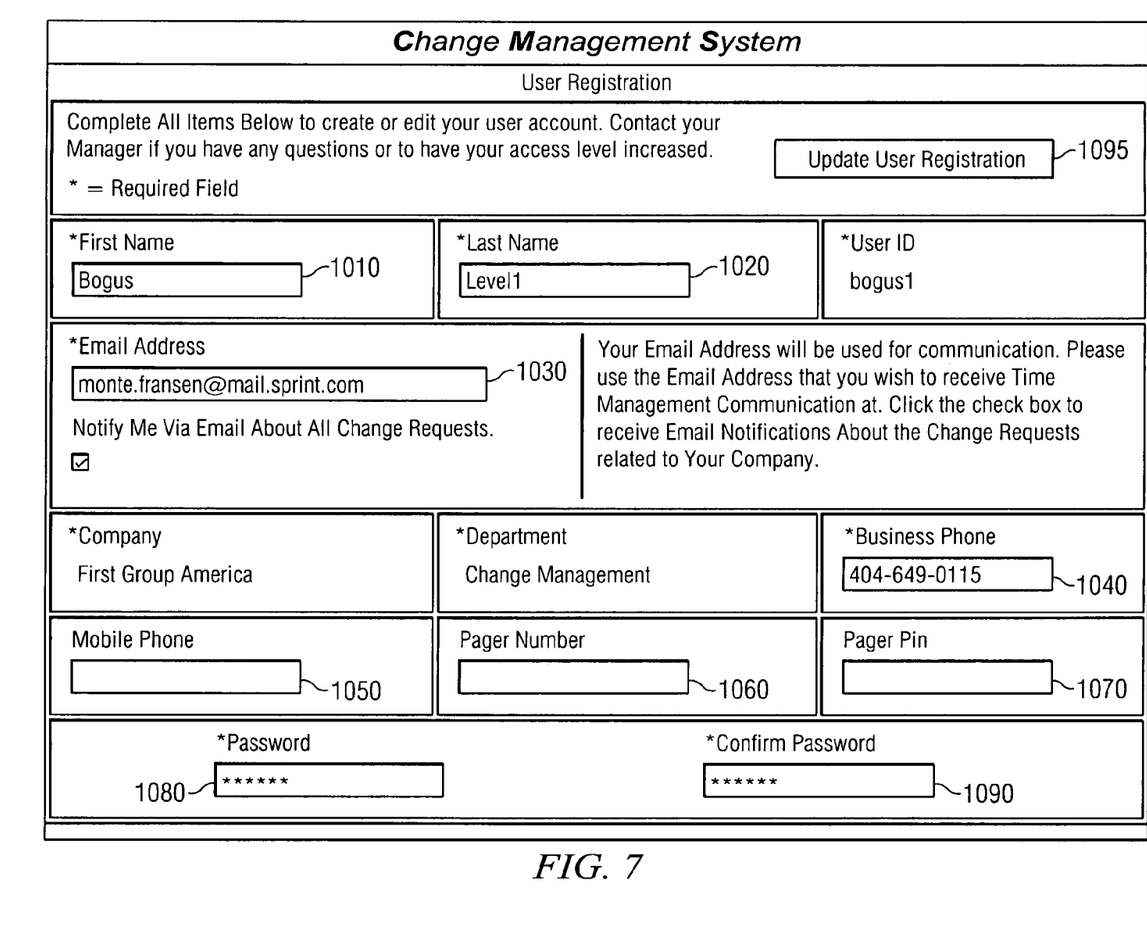
FIG. 7 is a printout of a computer screen depicting a web page used for user registration.

FIG. 7 is an example of a web page users can complete to register themselves into the computerized version of the Change Management Procedure or to edit previously entered registration information. The user's first name and last name are entered in fields 1010 and 1020, respectively. The user's email address is entered in field 1030. The user's business phone number, mobile phone number, pager number, and pager PIN are entered in fields 1040, 1050, 1060, and 1070, respectively. The user's password is entered in field 1080 and is confirmed in field 1090. Button 1095 is used to submit a completed registration form. An email notification is sent to the change manager when the user submits the registration information for authentification. Another email is sent to the user when the change manager authenticates the user and assigns the permission level of the user.

Figure 8:
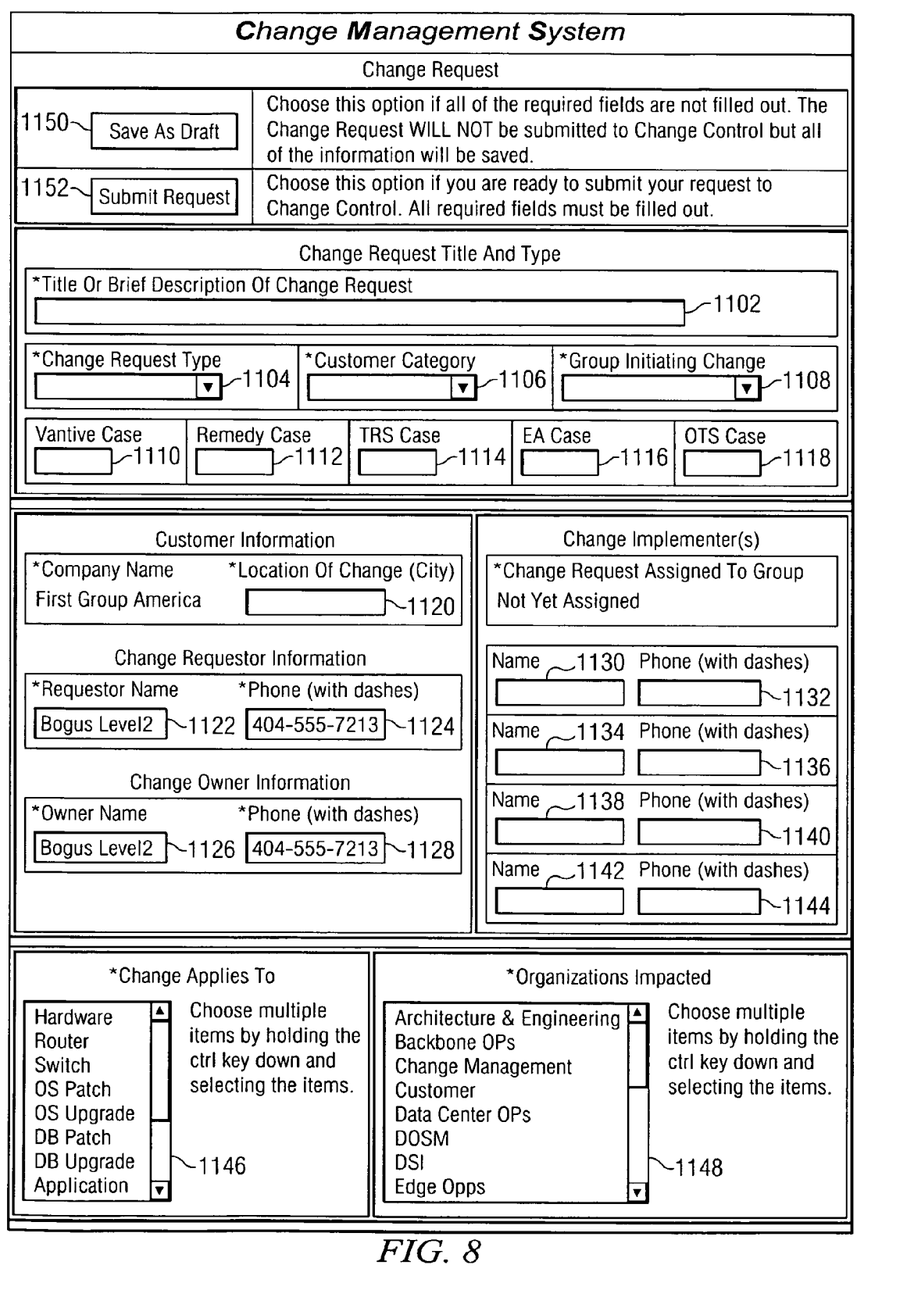
FIG. 8 is a printout of a computer screen depicting a web page used for submitting change requests.

FIG. 8 is an example of a section of a web-based change request document. A short description of the proposed change is entered in field 1102. This becomes the title of the change. The change request type is entered in field 1104, the customer category is entered in field 1106, and the group initiating the change request is entered in field 1108. The latter three fields are drop-down boxes allowing the user to choose from a predefined list of valid entries. Fields 1110, 1112, 1114, 1116, and 1118 allow the user to specify the trouble ticketing system associated with the proposed change. The location of the organization requesting the change is entered in field 1120. The name and phone number of the change requester are entered in fields 1122 and 1124, respectively. If a person in the requesting organization other than the change requester oversees the change request process, that person's name and phone number are entered in fields 1126 and 1128, respectively. The names and phone numbers of the change implementer or implementers are entered in fields 1130, 1132, 1134, 1136, 1138, 1140, 1142, and 1144. Field 1146 is a scroll box in which one or more types of devices or systems to which the proposed change applies are chosen. Field 1148 is a scroll box in which organizations potentially impacted by the proposed change are chosen. Button 1150 allows a user to save a partially completed change request form without submitting the form. Button 1152 allows a user to submit a completed form to the change manager. Additional sections of the web-based change request document, not shown, may include, but are not limited to, a detailed description of the change, details of the device, software, or facility affected, database or application outages due to the change, the test plan and test results, and the backout plan.

Examples of email distribution lists are shown in FIG. 9. Radio buttons 1210, 1220, and 1230 allow a user to select the distribution list to which an email should be sent. Button 1240 takes the user to a screen that allows new email distribution groups to be created.

The screen used to edit the email distribution lists is shown in FIG. 10. Email distribution lists allow the ability to tailor the broadcast notifications and review team notifications to specific team members based on the status of the change request, who initiated the change, the content of change, or any combination of the three. The group name of the distribution list is entered in field 1310. The change request status that causes an email to be sent to the specified group is selected in field 1320. The organization to which the specified group belongs is selected in field 1330. The department within the organization is selected in field 1340. A description of the group can be entered in field 1350. The individuals within the group are listed in field 1360. Button 1370 is used to submit updated information after changes have been made to the other fields on the screen. Button 1380 is used to delete a group and button 1390 is used to cancel any changes and return the group's information to its previous state.

What is claimed is:

1. A method for managing change to protect the integrity of an enterprise's computer operating environment comprising the steps of:

(a) submitting a change request document by a change requester to a change manager for validation, wherein the change requester and the change manager are separate entities;

(b) broadcasting notice of a proposed change described ill a valid change request document to at least one potentially interested operating unit within the enterprise, wherein the potentially interested operating unit is an organization comprising a plurality of individuals, and wherein said change consists of modifications to hardware, software, or both in an electronic computing system of the enterprise;

(c) reviewing said proposed change by a review team comprising said change manager and a representative of each potentially interested operating unit receiving notification of said proposed change and choosing to participate in said review team, said review team recommending a course of action regarding said proposed change, wherein the representative of the potentially interested operating unit is one of the individuals; and (d) notifying said change requester of said review team's recommended course of action regarding said proposed change;

wherein the implementation of said change is unsuccessful and the method further comprises the steps of:

(e) leaving in place any partial successful steps taken in the implementation of said change;

(f) rescheduling any remaining steps to be taken implementation of said change;

(g) notifying all potentially interested operating units of the status of said change; and (h) updating said change request document with the status of said change.

2. The method of claim 1 further comprising the step of said change requester revising and resubmitting a change request document rejected by the review team.

3. The method of claim 1 further comprising the step of said change requester canceling a change request document rejected by the review team.

4. The method of claim 1 farther comprising the step of said change manager, with input from said review team, scheduling implementation of a change described in a change request document approved by the review team.

5. The method of claim 4 further comprising the step of said change manager notifying each potentially interested operating unit of the schedule for and details of implementation of said change.

6. The method of clam 5 further comprising the step of said change requester or a designee of the change requester or change manager implementing said change.

7. The method of claim 6 further comprising the step of updating said change request document with the status of said change.

8. The method of claim 7 further comprising the step of said change manager notifying each potentially interested operating unit that said change has been implemented.

9. The method of claim 8 wherein at least one potentially interested operating unit is an asset management organization responsible for maintaining an inventory of the enterprise's assets.

10. The method of claim 8 further comprising the step of performing an analysis of the effectiveness of the change management method after implementation of said change.

11. The method of claim 10 further comprising the step of generating a written report describing the effectiveness of said change management method with regard to said change.

12. The method of claim 11 further comprising the step of assigning each change requester a security clearance level corresponding to an approved set of operations that the change requester may perform with respect to a change request document.

13. The method of claim 12 wherein the set of operations further comprises viewing, editing, and submitting a change request document.

14. The method of claim 12 further comprising the step of implementing said change management method on an electronic computing system.

15. A method for managing change to protect the integrity of an enterprise's computer operating environment comprising the steps of:

(a) submitting a change request document by a change requester to a change manager for validation, wherein the change requester and the change manager are separate entities;

(b) broadcasting notice of a proposed change described in a valid change request document to at least one potentially interested operating unit within the enterprise, wherein the potentially interested operating unit is an organization comprising a plurality of individuals, and wherein said change consists of modifications to hardware, software, or both in an electronic computing system of the enterprise;

(c) reviewing said proposed change by a review team comprising said change manager and a representative of each potentially interested operating unit receiving notification of said proposed change and choosing to participate in said review team, said review team recommending a course of action regarding said proposed change, wherein the representative of the potentially interested operating unit is one of the individuals; and (d) notifying said change requester of said review team's recommended course of action regarding said proposed change;

wherein the implementation of said change is unsuccessful and the method further comprises the steps of:

(e) reversing all steps taken in the attempted implementation of said change;

(f) notifying all potentially interested operating units of the unsuccessful implementation of said change; and (g) updating said change request document with the status of said change.

16. A method for managing change to protect the integrity of an enterprise's computer operating environment, when said change is necessitated by an emergency situation, comprising the steps of:

(a) evaluating the severity of said emergency situation by a change requester;

(b) notifying a change manager by said change requester that said emergency situation exists, wherein the change requester and the change manager are separate (c) determining by said change manager that said emergency situation requires immediate remediation;

(d) granting immediate approval to change requester by said change manager to implement said change wherein said change consists of modifications to hardware, software, or both in an electronic computing system of the enterprise;

(e) implementing said change by said change requester or a designee thereof; and (f) creating and completing, by said change requester after implementation of said change, an emergency change request document to describe and record said change;

wherein the implementation of said change is unsuccessful and the method further comprises the steps of:

(g) leaving in place any partial, successful steps taken in the implementation of said change;

(h) rescheduling any remaining steps to be taken in the implementation of said change;

(i) notifying all potentially interested operating units of the status of said change; and (j) updating said change request document with the status of said change.

17. A method for managing change to protect the integrity of an enterprise's computer operating environment, when said change is necessitated by an emergency situation, comprising the steps of:

(a) evaluating the severity of said emergency situation by a change requester;
(b) notifying a change manager by said change requester that said emergency situation exists, wherein the change requester and the change manager are separate entities;
(c) determining by said change manager that remediation of said emergency situation can be deferred;
(d) notify said change requester by said change manager that an emergency change request document must be submitted prior to approval;
(e) submitting an emergency change request document by said change requester to said change manager;
(f) approving of a change described in said emergency change request document by said change manager or a designee thereof wherein said change consists of modifications to hardware, software, or both in an electronic computing system of the enterprise;
(g) scheduling of said change by said change manager with collaboration from at least one potentially interested operating unit;
(h) notifying each potentially interested operating unit of the schedule for and details of implementation of said change; and
(i) implementing said change by said change requester or a designee thereof;
wherein the implementation of said change is unsuccessful and the method further comprises the steps of:
(j) reversing all steps taken in the attempted implementation of said change;
(k) notifying all potentially interested operating units of the unsuccessful implementation of said change; and
(l) updating said change request document with the status of said change.

18. The method of claim 17 further comprising the step of updating said emergency change request document with the status of said change.

19. The method of claim 18 further comprising the step of said change manager notifying each potentially interested operating unit that said change has been implemented.

20. The method of claim 19 wherein at least one potentially interested operating unit is an asset management organization responsible for maintaining an inventory of the enterprise's assets.

21. The method of claim 19 further comprising the step of performing an analysis of the effectiveness of the change management method after implementation of said change.

22. The method of claim 21 further comprising the step of generating a written report describing the effectiveness of said change management method with regard to said change.

23. The method of claim 22 further comprising the step of implementing said change management method on an electronic computing system.

24. The method of claim 23 wherein said change requester or a designee thereof reverses any actions taken in an unsuccessful implementation of said change.

25. The method of claim 22 wherein said change requester or a designee thereof reverses any actions taken in an unsuccessful implementation of said change.

\* \* \* \* \*

UNITED STATES PATENT AND TRADEMARK OFFICE
CERTIFICATE OF CORRECTION

PATENT NO. : 6,996,601 B1
DATED : February 7, 2006
INVENTOR(S) : H. Winnfred Smith It is certified that error appears in the above-identified patent and that said Letters Patent is hereby corrected as shown below:

Column 10,
Line 58, replace "described ill" with -- described in --.

Column 11,
Line 12, replace "partial" by -- partial, --.
Lines 14-15, replace "taken implementation" with -- taken in the implementation --.
Line 34, replace "clam 5" with -- claim 5 --.

Column 12,
Line 40, after "separate" add -- entities; --.

Column 13,
Line 9, replace "notify said" with -- notifying said --.

Column 14,
Line 24, replace "claim 23" with -- claim 22 --.
Line 27, replace "claim 22" with -- claim 23 --.

Signed and Sealed this

Thirteenth Day of June, 2006

JON W. DUDAS
*Director of the United States Patent and Trademark Office*